April 14, 1936.    C. E. STEVENS    2,037,397
TURNSTILE
Filed June 30, 1934
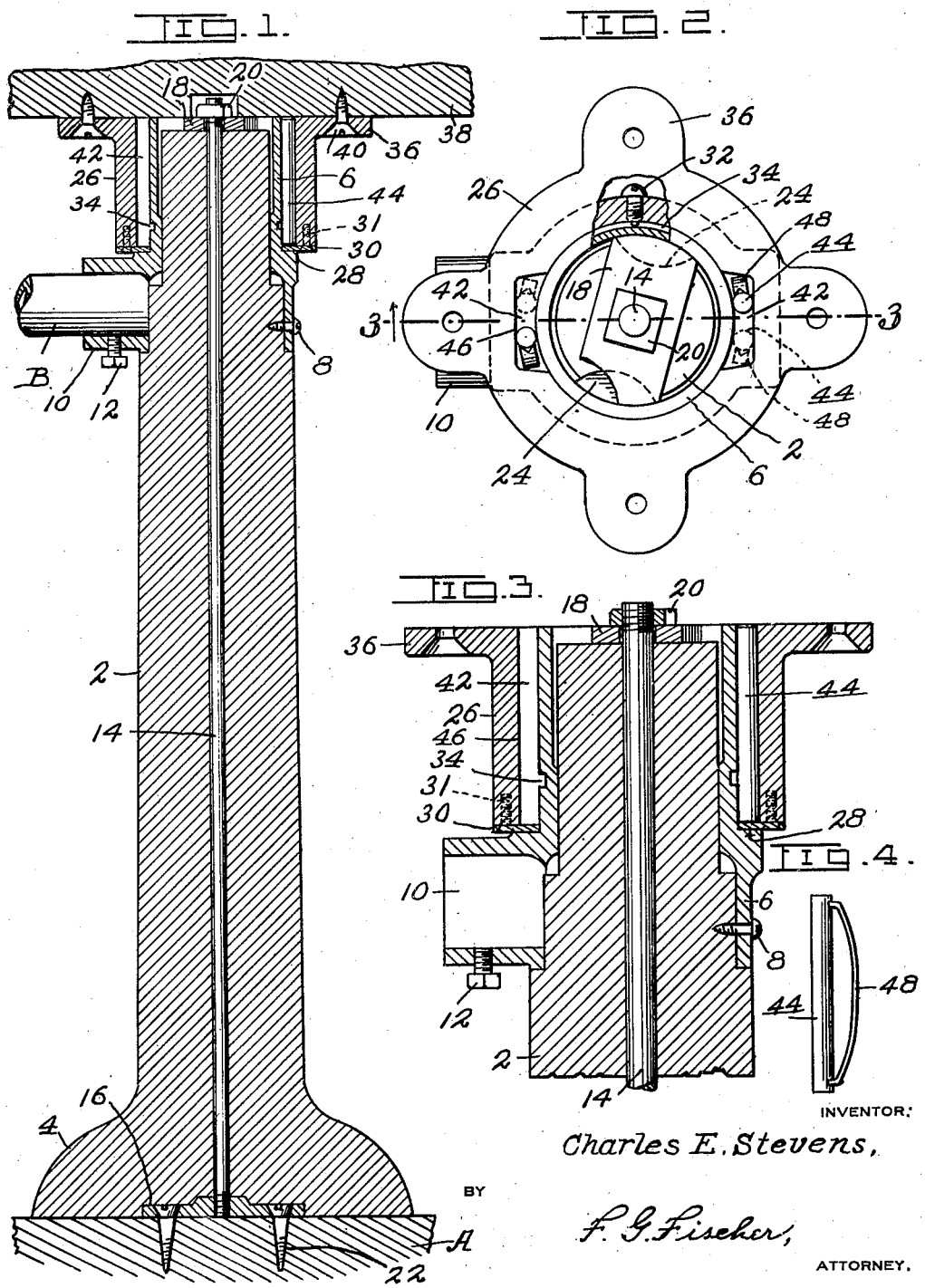
INVENTOR:
Charles E. Stevens,
BY
F. G. Fischer,
ATTORNEY.

Patented Apr. 14, 1936

2,037,397

UNITED STATES PATENT OFFICE 2,037,397

TURNSTILE

Charles E. Stevens, Kansas City, Mo.

Application June 30, 1934, Serial No. 733,269

4 Claims. (Cl. 39—3)

My invention relates to a turnstile which is intended more particularly for use in self-serving food stores although it may also be used to advantage in other locations.

One object of the invention is to provide means whereby the turnstile may be firmly anchored to the floor of the store to successfully withstand the rough usage to which devices of this character are subjected.

A further object is to provide a simple clutch mechanism which is unidirectional in its operation so that it may be arranged to permit the arms of the turnstile to rotate either to the right or to the left and locked in either instance from rotation in the reverse direction.

Another object is to provide a device of this character of simple and durable construction and the constituent parts of which may be readily assembled or taken apart.

Other objects will hereinafter appear, and in order that the invention may be fully understood reference will now be had to the accompanying drawing, in which:

Fig. 1 is a vertical central section of the turnstile with a portion of the arms thereof broken away.

Fig. 2 is an enlarged plan view of the parts disclosed by Fig. 1.

Fig. 3 is a broken vertical section on line 3—3 of Fig. 2.

Fig. 4 is a detail of a clutch roller and a spring associated therewith.

In carrying out the invention I provide a post 2 with an enlarged base 4 to provide a broad bearing surface upon a suitable support such as the floor A of the store in which the turnstile is installed.

6 designates a stationary annular member fixed to the upper portion of the post 2 by suitable means such as a screw 8. The annular member 6 is provided with a laterally projecting tubular member 10 for the reception of one end of a member B forming part of the usual railing which directs the customers to one side of the turnstile. A set screw 12 is threaded into the tubular member 10 for engaging and securing the adjacent end of the member B in place.

In addition to providing the post 2 with the enlarged base 4, said post is firmly secured to the floor A by anchoring means consisting preferably of a rod 14, a base plate 16, a plate 18 and a nut 20. The rod 14 extends vertically through the post and is secured at its lower end in the base plate 16, which latter located in a recess in the bottom of the post 2 is rigidly secured to the floor A by suitable means such as screws 22. The plate 18 has a central aperture to permit its passage over the upper end of the rod 14, so that it may be seated upon diametrically opposed lugs 24 projecting inwardly from the annular member 6. The nut 20 is threaded upon the upper end of the rod 14 so that it may be screwed downwardly upon the plate 18 and thus firmly hold the latter upon the lugs 24.

26 designates a rotatable hub journaled upon the annular member 6 and adapted to rest upon a circumferential shoulder 28 formed upon said annular member 6 at a point just above the tubular member 10. A washer of fiber or other suitable material 30, held in place with screws 31, is interposed between the lower end of the hub 6 and the upper end of the shoulder 28 to support clutch rollers hereinafter described and eliminate any noise which might otherwise occur if the metal hub 26 were permitted to rotate directly upon the metal shoulder 28. After the hub 26 has been placed upon the annular member 6 it is secured against displacement by suitable means such as a screw 32 threaded in the circular wall of the hub and projecting at its inner end into a circumferential groove 34 formed in the annular member 6.

The upper portion of the hub 26 is provided with radial lugs 36 to which the turnstile arms 38 are secured by suitable means such as screws 40. Diametrically opposed recesses 42 are formed in the inner portion of the hub 26 and extended from the top to the bottom of said hub as shown by Figs. 1 and 3.

The recesses 42 are provided for the reception of a pair of clutch rollers 44 which rest upon the washer 30 and frictionally engage the periphery of the annular member 6 and the straight sides 46 of the respective recesses 42. The rollers 44 are pressed towards the narrow intermediate portions of the recesses 42 by springs 48 and thus prevent the hub 26 from rotating in but one direction when the turnstile is in operation. However, on referring to Fig. 2 it will be noted that the recesses 42 extend equally on opposite sides of a line extending diametrically through the hub 26 so that the rollers 44 and springs 48 may be changed to the dotted line positions when it is desired to rotate the hub in the opposite direction. Hence, it will be understood that the rollers 44 and the springs 48 may be arranged to permit the hub 26 and the arms 38 to rotate either to the right or to the left and in either instance will prevent rotation in the reverse direction.

When the rollers 44 are in the full line position,

Fig. 2, the hub 26 may be freely rotated in an anticlockwise direction, as said hub will frictionally engage said rollers 44 and tend to carry them away from the narrow portions of the recesses 42 against the action of the respective springs 48. Any attempt to rotate the hub 26 in a clockwise direction will cause the hub to cooperate with the springs 48 in wedging the rollers 44 in the narrow portions of the respective recesses 42 and thus frictionally check the movement of the hub 26. When the turnstile is placed in a location where it is necessary to rotate it in a clockwise direction the rollers 44 and the springs 48 are transferred to the dotted line position, Fig 2.

From the foregoing description, taken in connection with the drawing, it is apparent that I have provided a turnstile embodying the advantages above pointed out, and while I have shown a preferred form of the invention I reserve all rights to such changes and modifications as properly fall within the spirit and scope of the invention as claimed.

Having thus described my invention, what I claim and desire to secure by Letters Patent, is:

1. A turnstile comprising a post adapted to rest upon a floor or other support, a stationary annular member fixed upon the upper portion of said post, a rod secured at its lower end to the support and extending upwardly through said post, a nonrotatable element resting on the annular member and through which said rod extends, a member threaded upon the upper end of the rod and seated upon said element to coact with the latter and the rod in securing the post upon its support, a hub rotatably mounted upon the annular member, manual means for rotating said hub, and means for locking the hub against reverse rotation.

2. A turnstile comprising a post, a stationary annular member fixed to the upper portion of said post, a hub rotatably mounted upon said annular member and having a recess extending on opposite sides of a line projected diametrically through said hub, a spring pressed clutch roller adapted to be placed in said recess at either side of said line so that the hub may rotate either to the right or to the left but be locked by the roller in either instance against rotation in the reverse direction, and arms on the hub for rotating the same.

3. A turnstile comprising a post, a stationary annular member fixed to the upper portion of said post, a hub adapted to rotate either in a clockwise or an anticlockwise direction upon said annular member and provided with recesses having contracted intermediate portions, means for retaining said hub upon the annular member, arms fixed to said hub, clutch rollers adapted to be placed in the respective recesses at either side of the contracted intermediate portions, and spring means adapted to be placed in either of the wide portions of the recesses to normally press the respective clutch rollers towards the narrow intermediate portions of said recesses and into frictional engagement with the annular member and the hub to prevent the latter from rotating in the same direction in which the clutch rollers are being pressed by the respective springs.

4. A turnstile comprising a post having an integral base adapted to rest upon a floor and provided with a central recess in its bottom portion, a base plate adapted to be secured to the floor and fit within said recess, a rod secured to the base plate and extending upwardly through the post, means at the upper end of said rod adapted to coact therewith in firmly securing the post in position upon the floor, manually controlled rotatable means at the upper portion of the post, and clutch means at the upper portion of the post adapted to control the direction of travel of said rotatable means.

CHARLES E. STEVENS.